Nov. 30, 1948.   A. G. FORSYTH   2,455,000
ELECTRICALLY OPERATED PITCH CHANGING MECHANISM
Filed Aug. 12, 1943   4 Sheets-Sheet 1

Inventor
ARCHIBALD
GRAHAM
FORSYTH,
By Robert B Larson
Attorney

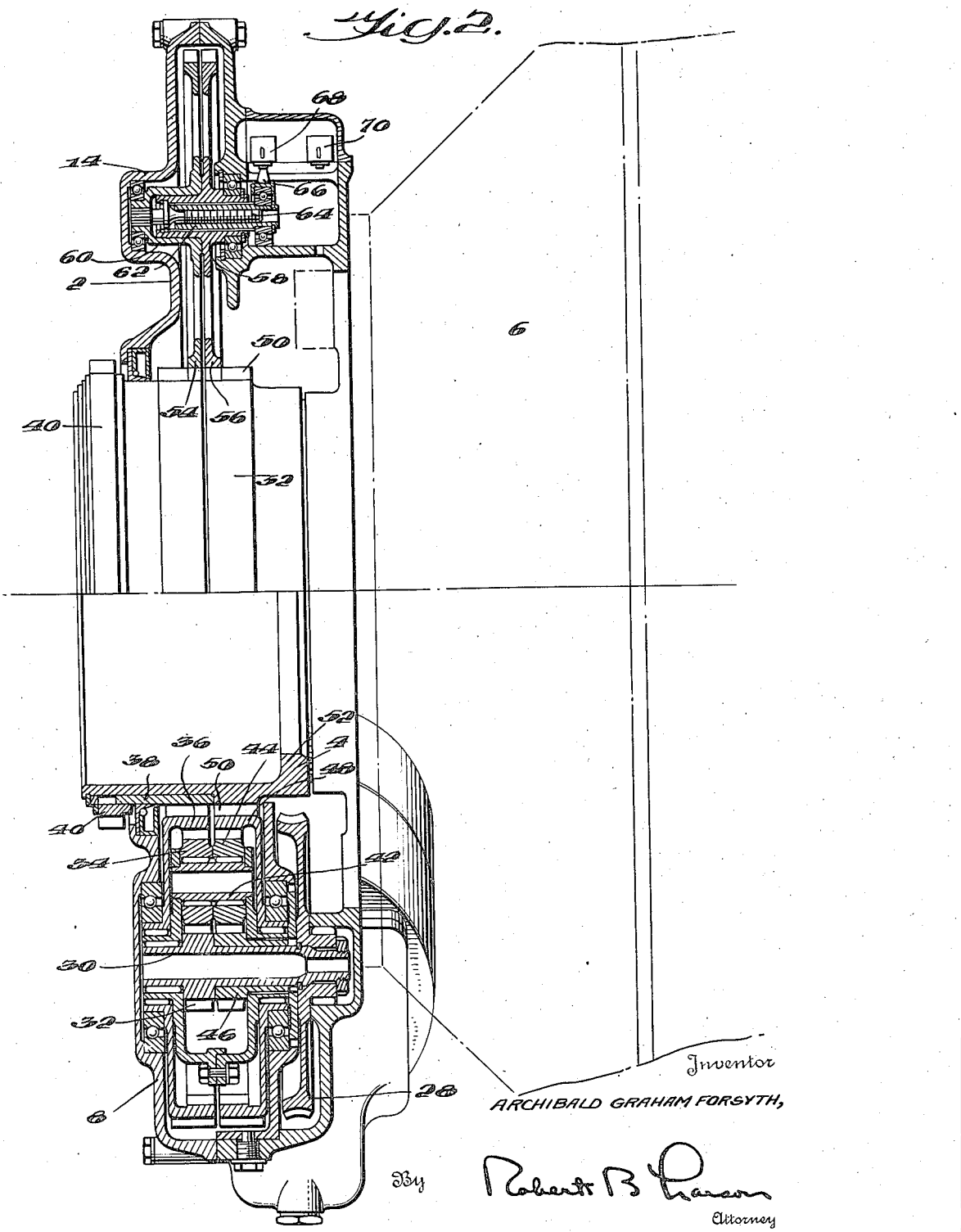

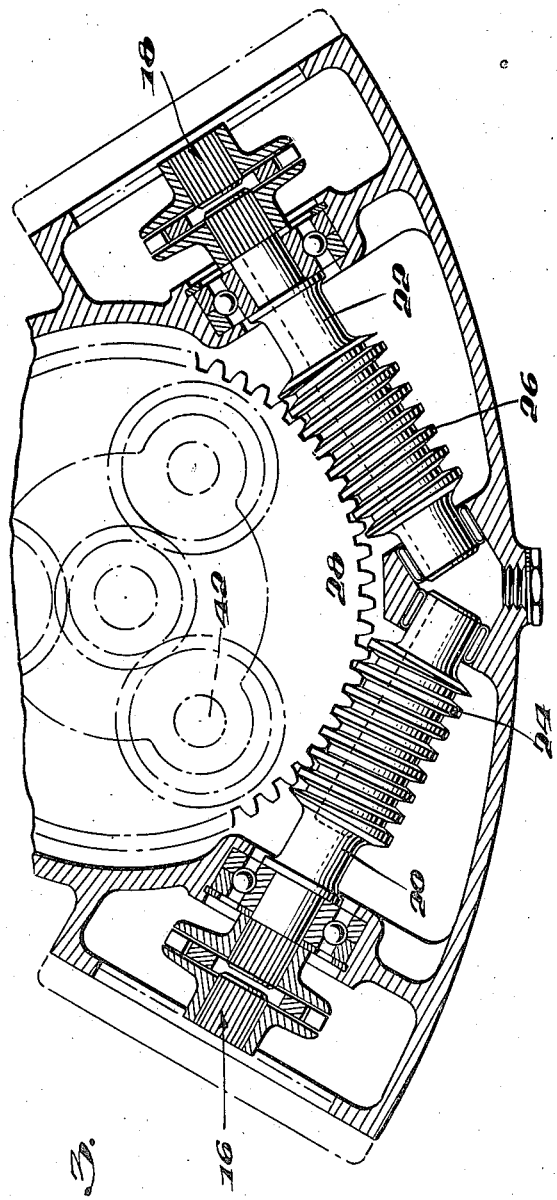

Nov. 30, 1948.  A. G. FORSYTH  2,455,000
ELECTRICALLY OPERATED PITCH CHANGING MECHANISM
Filed Aug. 12, 1943  4 Sheets-Sheet 4
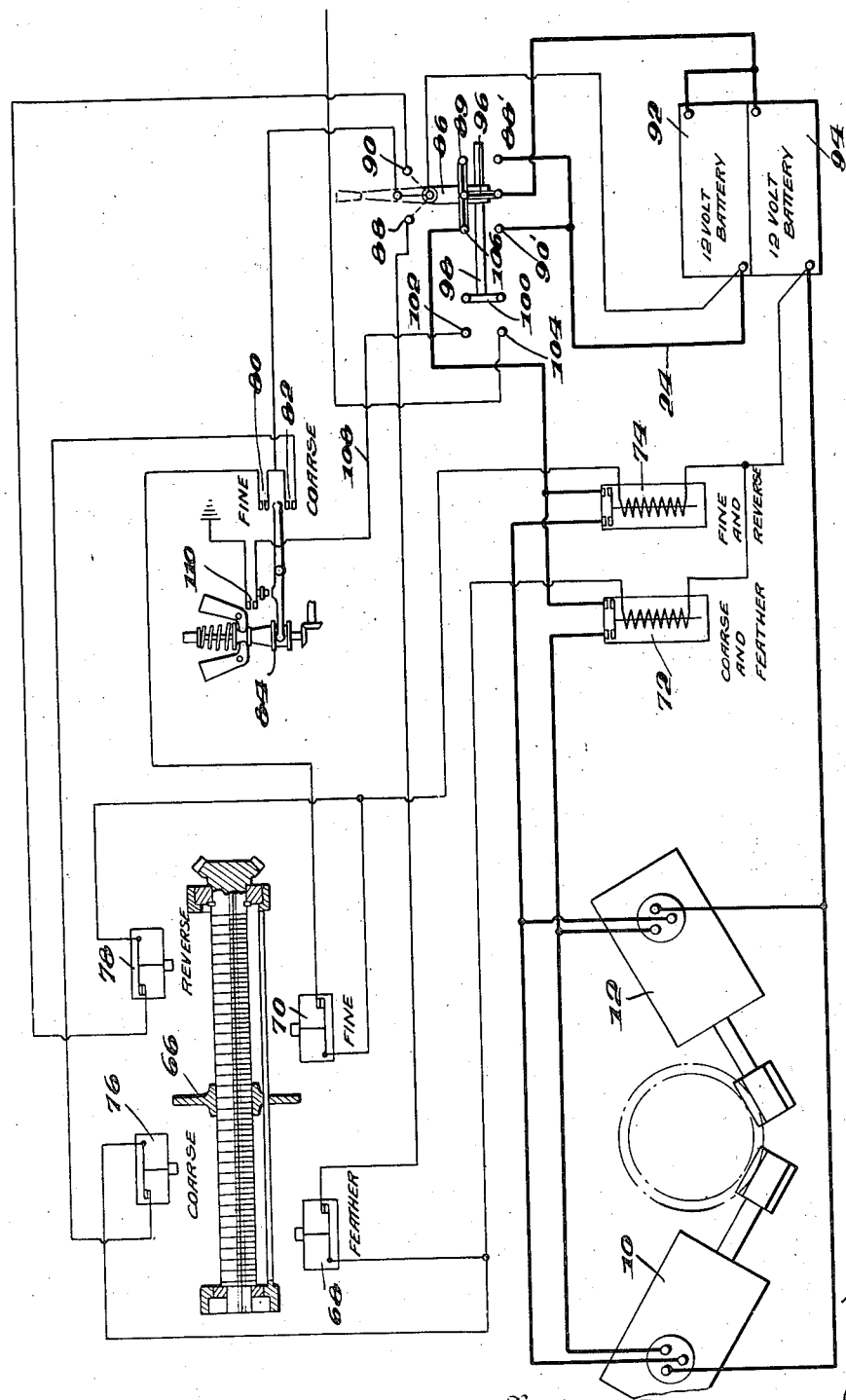
Inventor
ARCHIBALD
GRAHAM
FORSYTH,
By Robert B. Larson
Attorney Patented Nov. 30, 1948

2,455,000

UNITED STATES PATENT OFFICE 2,455,000

ELECTRICALLY OPERATED PITCH CHANGING MECHANISM

Archibald Graham Forsyth, Cheam, England, assignor to The Fairey Aviation Company Limited, Hayes, Middlesex, England Application August 12, 1943, Serial No. 498,366

4 Claims. (Cl. 170—163)

This invention relates to pitch changing mechanism for aircraft propellers and the like. More particularly the invention relates to an electrically operated and controlled unit of simple balanced construction, light in weight and requiring but little space, and capable of effecting pitch changes to coarse, fine, feathering and reverse pitch positions. It is a general object of the invention to provide a device having these characteristics.

Another object of the invention is the provision of such a device which is capable of effecting pitch changes at differing rates of speed at the will of the operator.

These and other objects of the invention will become more apparent from the following description and claims and the accompanying drawings in which:

Figure 2 is a sectional view taken on the line 2—2 of Figure 1.

Figure 3 is an enlarged vertical section through the lower portion of the unit and taken on a line at right angles to the section of Figure 2, and Figure 4 is a diagrammatic representation of a control circuit embodying certain features of this invention.

Figure 1:
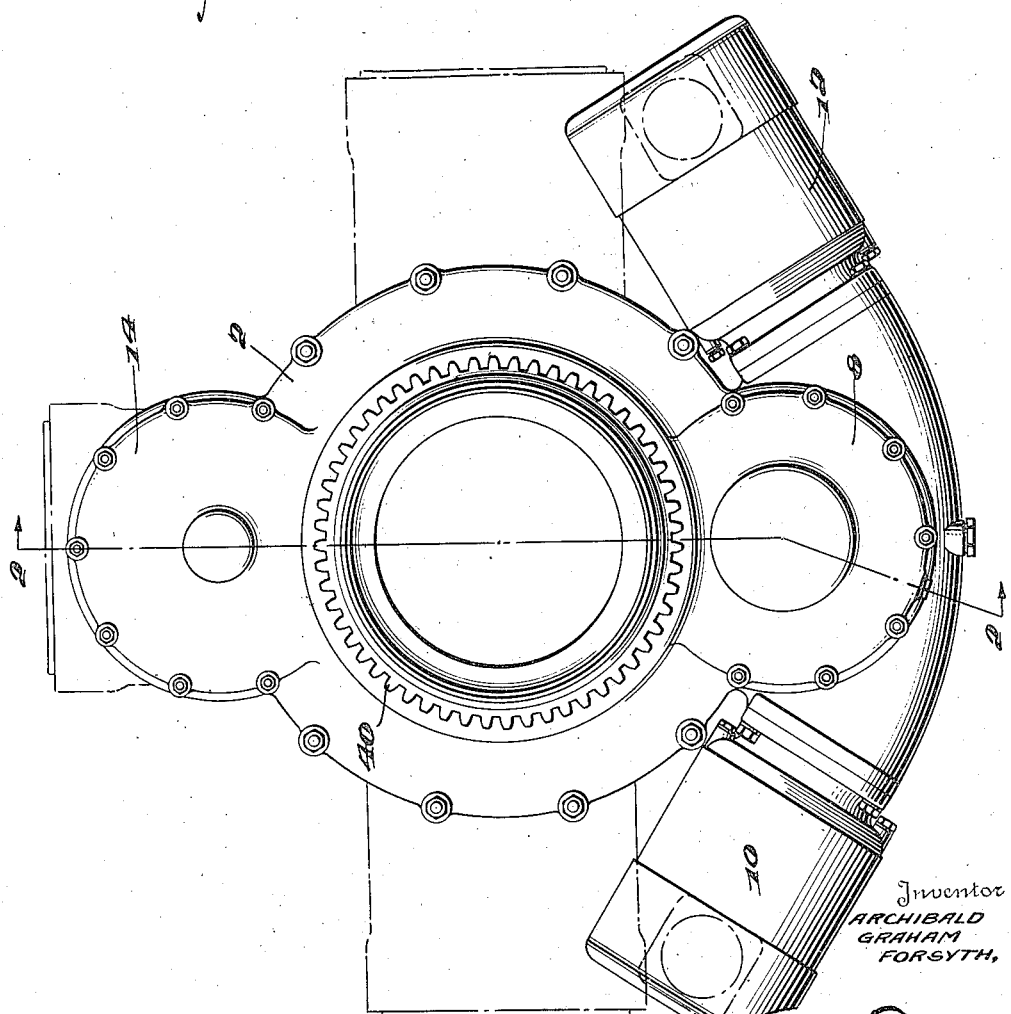
Figure 1 is a front elevation of a unit embodying the invention.

The control unit comprising the invention is contained in a housing 2 which is adapted to be disposed on a sleeve 4 surrounding the propeller drive shaft. The housing is disposed between the propeller hub and the aircraft engine 6 and is connected to the front facing of the latter by any suitable means.

Generally speaking, the housing contains a pitch changing drive system indicated by the reference numeral 8 which is adapted to be actuated in either direction by two electric motors 10 and 12; and a limiting device indicated by the reference numeral 14, the purpose of which is to stop the pitch changing mechanism after it has reached predetermined limits for coarse, fine, feathering and reverse pitch positions. As shown in Figure 3, the shafts of the electric motors 10 and 12 are adapted, respectively, to be splined to the couplings 16 and 18, which, in turn, are connected with the shafts 20 and 22 provided with the worms 24 and 26. Each worm engages a worm wheel 28.

Referring to Figure 2, the worm wheel 28 is keyed to a hollow shaft 30. The shaft 30 is provided on its outer periphery with teeth 32 which engage teeth on pinions such as 34. The pinions in turn engage teeth on the inner periphery of a member 36 which is mounted for rotation about the axis of the shaft 30. Teeth on the outer periphery of the member 36 engage teeth on a sleeve 38 which is splined to ring gear 40. The ring gear 40 is adapted to be disposed in engagement with the pitch changing mechanism on the propeller hub in the manner which has been described in several of my copending applications, such as Serial No. 465,618, filed November 14, 1942, now Patent 2,426,007.

The pinions such as 34 are mounted for rotation on shafts such as 42. The shafts 42 also carry pinions such as 44, the teeth of which engage teeth on a sleeve 46 disposed on the shaft 30 and also teeth on the inner periphery of a member 48. The member 48 has teeth on its outer periphery which engage teeth 50 on sleeve 52 splined to the propeller drive shaft, the teeth on sleeve 52 differing in number from those on sleeve 38.

It will be noted that operation of the motors 10, 12, in one direction, for example, will rotate the shafts 20, 22 and through the worms 24, 26 will actuate the gear wheel 28. This in turn will rotate the shaft 30, actuate the pinion 34 and cause rotation of the member 38. This causes relative rotation between the sleeve 38 and the sleeve 52. Rotation of the sleeve 38 effects pitch changing.

Pitch changing movement in the other direction is effected in a similar manner by reversing the motors.

It will be noted that pitch changing movement will not be effected unless the motors 10 or 12 are energized. If these motors are not energized, the members 38 and 48 will rotate at the same rates of speed and consequently there will be no relative movement between the sleeve 38 and the sleeve 52 so that no pitch changing movement will occur.

With reference now to the structure shown in the upper part of Figure 2, the limiting device 14 is comprised of two gear wheels 54 and 56. The gear wheel 56 is provided with a hollow spindle 58, a portion of which is disposed within the hollow spindle 60 of the gear wheel 54. The hollow spindle 58 of gear wheel 56 has a member 62 splined therein so that the member 62 can move axially without turning. The member 62 has an internally threaded bore adapted to receive a threaded shaft 64, the other end of which is splined to rotate with the gear wheel 54. The inner end of the member 62 carries four tripping elements such as 66, adapted when moved to trip pitch limit switches such as 68 and 70 as will be hereinafter described.

Gear wheels 54 and 56 engage, respectively, the teeth on sleeve 38 and the teeth on the outer periphery of sleeve 52. During normal operation when no pitch changing movement occurs, the gear wheels 54 and 56 will thus run at the same rates of speed. If, however, either motor 10 or motor 12 is energized to effect pitch changing movement, the sleeve 38 will move relatively with respect to gear wheel 56. This relative movement between gear wheels 54 and 56 will cause the member 62 to move to the right or to the left during pitch changing movement, and it will eventually trip one of the pitch limit switches. The pitch limit switches are so connected as to cut off the motors after predetermined pitch positions have been attained.

An electric control circuit for the arrangement described is illustrated in Figure 4. In the circuit are included the electric motors 10 and 12, two solenoid switches 72 and 74, and four pitch limit switches 68, 70, 76 and 78 for feather, fine, coarse and reverse pitch positions respectively; two switches 80 and 82 adapted to be actuated by a governor controlled mechanism 84 driven by the aircraft engine; a master switch 86 having "feather" position indicated by the terminals 88, 88' and "reverse" position indicated by terminals 90, 90'. The circuit is adapted to be powered by two 12 volt batteries 92, 94 which, at the will of the operator, can be connected to produce a 24 volt total when it is desired to effect pitch changing movement at a greater rate of speed.

The element 66 for tripping the pitch limit switches 68 and 70 and 76 and 78 is diagrammatically represented in Figure 4 as disposed on a threaded shaft. It will be understood, however, that preferably the elements 66 are mounted in the manner illustrated in Figure 2 so as to be moved when relative rotary movement takes place between the gear wheels 54 and 56.

In operation the device works as follows: During normal flight, the governor device 84 will be actuated by the aircraft engine to close the fine switch 80 or the coarse switch 82. The main switch 86 will be in the position indicated in Figure 4. Assuming that the fine switch 80 has been closed by the governor, the circuit is so connected that the solenoid 74 is energized, thus closing its contacts so that the two motors 10 and 12 will be rotated on 12 volts to effect pitch changing movement to fine pitch position. Such pitch changing movement immediately causes the element 66 to move toward the fine pitch limit switch 70 and such movement continues unless the governor device 84 switches over to coarse pitch position or until the fine pitch limit switch 70 has been tripped, thus shutting off the motors.

Movement to coarse pitch position is similarly effected when the governor closes the coarse pitch switch 82 thus energizing solenoid 72 causing the motors to run the opposite direction and causing element 66 to move toward coarse pitch limit switch 76.

Feathering pitch position is effected by moving the master switch 86 to feathering position, (to terminal 88). The switch 86 carries with it a contact bar 96 disposed on a rod 98, the other end of which carries a contact bar 100 adapted in one position to bridge the terminals 102, 104. Movement of the switch 86 to feather position causes bar 96 to bridge terminals 88', 89, energizes the solenoid 72 and connects the two motors 10 and 12 into the circuit so as to be operated by both batteries 92 and 94 at a total of 24 volts, thus causing more rapid pitch changing movement toward feathering position. Movement of the switch 86 to feathering position "overrides" the governor and pitch changing movement toward feathering position thus continues until the element 66 trips the feathering pitch limit switch 78m thus cutting off the motors.

Movement of the switch 86 to reverse position (to terminal 90) energizes the solenoid 74, thus closing its contact, and operates the two motors 10 and 12 in a direction toward reverse pitch with power supplied by both of the 12 volt batteries or with a total of 24 volts. This effects pitch changing movement toward reverse or braking pitch position which continues until the element 66 trips the reverse pitch limit switch 78, thus shutting off the motors.

When the switch 86 is moved to reverse pitch position, the contact bar 96 bridges contacts 90 and 106 to supply the added power and contact bar 100 bridges contacts 102 and 104 in the line running to the engine ignition and to ground in the line 108 running to the engine ignition system and to ground. The line 108 contains a switch 110 which is normally broken but which may be closed when the speed of the engine has been slowed down to a predetermined R. P. M.

The switch 110 thus constitutes a safety measure which prevents the device from effecting reverse pitch movement until the speed of the motor has been appropriately reduced to a predetermined R. P. M.

It will be noted that the arrangement in accordance with the invention is of simple, balanced construction, is light in weight and is capable of effectively actuating the pitch changing mechanism within predetermined limits of fine, coarse, feather and reverse pitch positions and that the device is so devised that pitch changing mechanism to reverse and feathering position can be attained more rapidly by empowering the motors with double the voltage normally employed in effecting pitch changing movements to coarse and fine positions.

It is realized that changes in structure and arrangement may be made without departing from the inventive concept and the invention is therefore not to be limited except as indicated in the following claims.

I claim:

1. A control unit for variable pitch propeller systems and adapted to be disposed surrounding the propeller drive shaft between the propeller hub structure and the engine, said control unit comprising a sleeve having gear teeth on the periphery thereof and mounted to rotate with a propeller drive shaft, a second sleeve having gear teeth on the periphery thereof and carried by said first sleeve for relative rotary movement with respect thereto, rotation of said second sleeve being adapted to effect pitch changing movement, a pair of electric motors, means for connecting said motors to drive said second sleeve relatively to said first sleeve, a control circuit for said motors including a plurality of fixed pitch limit switches and a selective switch arm cooperating therewith, and means in said circuit for applying additional voltage to said motors when pitch changing movement is to be effected toward certain predetermined pitch positions, and means actuated by relative movement between said sleeves for controlling said circuit to cut off said motors when predetermined pitch positions have been attained, said last-named means comprising a pair of co-axially mounted gear wheels, one of said gear wheels engaging with said gear teeth on said first sleeve and driven thereby, the other of said gear wheels engaging with said gear teeth on said second sleeve and driven thereby, a shaft co-axially mounted with respect to said gear wheels, and said switch arm comprising a shaft driven in a direction parallel to the axis of said gear wheels by the relative movement between said gear wheels.

2. A control unit for variable pitch propeller systems and adapted to be disposed surrounding the propeller drive shaft between the propeller hub structure and the engine, said control unit comprising a housing, a sleeve mounted to rotate with the propeller drive shaft and having teeth thereon, a second sleeve mounted on said first sleeve for relatively rotary movement, said second sleeve having teeth thereon, said second sleeve being adapted when rotated to effect pitch changing movement, a ring gear engaging the teeth on said second sleeve, a shaft having gear teeth thereon and disposed coaxially with said ring gear, a pinion engaging said shaft and teeth on the inner periphery of said ring gear, a second ring gear similar to said first ring gear, a teethed sleeve rotatably mounted on said shaft, a pinion in engagement with said toothed sleeve and said second ring gear, said second ring gear having teeth engaging said first sleeve, a pair of electric motors for driving said shaft, a control circuit for said motors, means in said control circuit for applying additional voltage to said motors when pitch changing movement is to be effected toward certain predetermined pitch positions, and control means within said housing and actuated by relative movement between said first and second sleeves for cutting off said motor means when predetermined pitch positions have been attained.

3. A control unit for variable pitch propeller systems and adapted to be disposed surrounding the propeller drive shaft between the propeller hub structure and the engine, said control unit comprising a housing a sleeve having gear teeth on the outer periphery thereof and mounted to rotate with the propeller drive shaft, a second sleeve carried by said first sleeve for relative rotary movement with respect thereto, rotation of said second sleeve being adapted to effect pitch changing movement, a pair of electric motors, means for connecting said motors to drive said second sleeve relatively to said first sleeve, and means actuated by relative movement between said sleeves for controlling said motors, said control means being disposed centrally at the upper part of the housing, said control means for said motors comprising an electric circuit including a plurality of fixed switches adapted to cooperate with a selective switch arm, a pair of co-axially mounted gear wheels one of said gear wheels engaging with said gear teeth on said first sleeve and driven thereby, the other of said gear wheels engaging with said gear teeth on said second sleeve and driven thereby, said selective switch arm comprising a shaft co-axially mounted with respect to said gear wheels and differentially driven in a direction parallel to the axis of said gear wheels by relative movement between said gear wheels, said connecting means being disposed centrally at the lower part of the housing, and said motors being carried by said lower part with one motor symmetrically on each lateral side of the unit said unit being self-contained.

4. A control unit for variable pitch propeller systems and adapted to be disposed surrounding the propeller drift shaft between the propeller hub structure and the engine, said control unit comprising a housing, a sleeve having gear teeth in its outer periphery and mounted to rotate with the propeller drive shaft, a second sleeve having gear teeth on its outer periphery and carried by said first sleeve for relative rotary movement with respect thereto, rotation of said second sleeve effecting pitch changing movement, a pair of electric motors carried symmetrically by said housing, means for connecting said motors to drive said second sleeve relatively to said first sleeve, and motor control means disposed centrally at the top of the housing and actuated by relative movement between said sleeves, said last-named means comprising a pair of co-axially mounted gear wheels, one of said gear wheels engaging with said gear teeth on said first sleeve and driven thereby, the other of said gear wheels engaging said gear teeth on said second sleeve and driven thereby, and reciprocable means movable by relative movement of said gear wheels for accomplishing said motor control.

ARCHIBALD GRAHAM FORSYTH.

REFERENCES CITED

The following references are of record in the file of this patent:

UNITED STATES PATENTS

| Number | Name | Date |
|---|---|---|
| 1,596,511 | Pistolesi | Aug. 17, 1926 |
| 1,999,091 | Ebert | Apr. 23, 1935 |
| 2,020,366 | MacCallum | Nov. 12, 1935 |
| 2,127,687 | Heath | Aug. 23, 1938 |
| 2,293,912 | Mullen | Aug. 25, 1942 |
| 2,334,967 | Thomas et al. | Nov. 23, 1943 |
| 2,346,007 | Chillson | Apr. 4, 1944 |

FOREIGN PATENTS

| Number | Country | Date |
|---|---|---|
| 218,800 | Switzerland | Dec. 31, 1941 |
| 379,731 | Italy | Apr. 4, 1940 |

OTHER REFERENCES

"Pilots' Powerplant Manual," L. E. Shedenhelm. Civil Aeronautics Bulletin No. 28, Oct. 1940.